3,684,496
SOLDER HAVING IMPROVED STRENGTH AT HIGH TEMPERATURES

Jun Tanaka and Yoshihiro Nishibori, Tokyo, Japan, assignors to Senju Metal Industry Co., Ltd., Tokyo, Japan
No Drawing. Filed Feb. 17, 1971, Ser. No. 116,224
Claims priority, application Japan, Mar. 17, 1970, 45/21,939; July 17, 1970, 45/62,090; July 20, 1970, 45/62,798
Int. Cl. C22c *17/00*
U.S. Cl. 75—178 AM    4 Claims

ABSTRACT OF THE DISCLOSURE

A solder consisting of 0.5–7% by weight silver, 0.5–2.5% by weight copper, 0.05–2% by weight chromium and/or 0.05–1% by weight nickel, preferably 0.1–2% by weight aluminium and 0.01–0.3% by weight magnesium and the remainder zinc is provided. This solder has a melting point of from 400° to 500° C., mechanical strength of at least 10 kg./mm.$^2$ at a temperature between from 100° C. to 200° C. and exhibits excellent resistance to corrosion.

---

This invention concerns a soft solder having improved strength at elevated temperatures.

The prior art tin-lead alloy solders and other solders used at high temperatures, in most cases, have melting points below 350° C. and the mechanical strength of such conventional solders is not only insufficient, but decreases as the temperature rises. All previous attempts to provide a soft solder which retains its mechanical strength at high temperature above at least 100° C. have never been successful.

On the other hand, a hard solder such as silver solder or brass solder has good mechanical strength and retains its strength at realtively high temperatures. However, these solders have melting points in excess of 700° C. and when articles of small thickness or of small size are being joined the soldering at such high temperatures may result in deformation and fracture of the articles being soldered. Thus the hard solders cannot be used for soldering articles of small thickness or of small size.

A review of the zinc-based solders developed in the past teaches us a number of species of zinc-based solder alloys. For instance, Japanese Pat. No. 223,959 (Patent publication No. 2,969/1956) discloses a Zn-Cu-Cd-Ag alloy having melting point between 270° C. and 315° C., which has improved properties at elevated temperatures. Japanese Pat. No. 413,171 (patent publication No. 17,133/1962) discloses a Zn-Cu-Al-Ag alloy having improved mechanical strength at high temperatures. However, these known zinc-based alloys have not been in practical use because of their low resistance to corrosion and brittleness.

According to this invention a solder alloy of improved strength at elevated temperatures which consists of 0.5– 7% by weight silver, 0.5–2.5% by weight copper, 0.05– 2% by weight chromium and/or 0.05–1% by weight nickel and the remainder zinc is provided.

This solder has a melting point between 400° C. and 500° C., mechanical strength (tensile strength) of at least 10 kg./mm.$^2$ at temperatures between 100° C. and 200° C. and excellent resistance to corrosion. By the use of the solder of this invention, articles of small thickness or of small size can be joined and the resulting bond will have improved mechanical properties at prolonged temperatures above 100° C.

The properties of this solder are further improved by addition of 0.1–2% by weight of aluminium and 0.01– 0.3% by weight magnesium.

Thus a preferred composition of the solder of this invention is: 0.5–7% by weight silver, 0.5–2.5% by weight copper, 0.1–2% by weight aluminium, 0.1–0.3% by weight magnesium, 0.05–2% by weight chromium and/ or 0.05–1% by weight nickel, and the remainder zinc.

Another preferred composition of the solder of this invention is: 1–5% by weight silver, 0.5–2% by weight copper, 0.05–0.75% by weight chromium and/or 0.08– 0.75% by weight nickel, and the remainder zinc.

One more preferred composition of the solder of this invention is: 1–5% by weight silver, 0.5–2% by weight copper, 0.3–1% by weight aluminium, 0.03–0.2% by weight magnesium, 0.08–0.75% by weight chromium and/or 0.08–0.75% by weight nickel, and the remainder zinc.

As has been explained, the solder of the present invention consists of 0.5–7% by weight silver, 0.5–2.5% by weight copper, 0.05–2% by weight chromium and/or 0.05–1% by weight nickel, and the remainder zinc, or of 0.5–7% by weight silver, 0.5–2.5% by weight copper, 0.05–2% by weight chromium and/or 0.05–1% by weight nickel, 0.1–2% by weight aluminium, 0.01–0.3% by weight magnesium, and the remainder zinc.

The reasons for limiting the proportions of alloying elements in the solder of the present invention are given as follows:

SILVER

Silver should be present for the purpose of improving tensile strength of the solder as well as obviating the increase in brittleness at an elevated temperature caused by addition of other elements. Silver also remarkably enhances resistance to corrosion.

The alloy of the present invention should contain at least 0.1% by weight, preferably 0.5% by weight of silver, since too low a silver content degrades the tensile strength. A silver content of more than 7% by weight raises the melting point above the melting temperature which is intended in the present invention. The present solder should contain not more than 7% by weight silver.

The preferred silver content ranges from 1 to 5% by weight.

COPPER

The solder of the present invention should contain no more than 2.5% by weight copper, because, though high content of copper improves tensile strength of the alloy, more than 2.5% by weight of copper brings about elevation of melting point and increase in hardness and thus brittleness of the alloy.

The preferred copper content ranges from 0.5 to 2% by weight.

CHROMIUM

Addition of chromium is a feature of the alloy of the present invention. One of the effects of chromium is to prevent increase in brittleness which is caused by addition of copper and to improve tensile strength of the alloy. The most characteristic effect of chromium is to increase tensile strength at temperatures from 100° C. to 200° C. However, too high a chromium content, that is, above 2% by weight, raises the melting point. In such a case the act of adding alloying elements becomes difficult. The chromium addition also contributes to prevention of intergranular corrosion of the solder. Chromium may be at least partly replaced by nickel.

The preferred chromium content ranges from 0.05 to 0.75% by weight.

NICKEL

Chromium can be replaced with nickel, which has the same effect as chromium. In order to obtain the effect desired by nickel addition, 0.05% by weight nickel is necessary. More than 1% by weight nickel raises the melting point of the solder and hardens it too much. Therefore, the appropriate nickel content of the solder is 0.05–1% by weight, and the preferred nickel content ranges from 0.05 to 0.75% by weight.

ALUMINIUM

Addition of aluminium improves soldering property of the solder. When iron articles are joined with a zinc-based solder containing no aluminium, a hard and brittle iron-zinc intermetallic compound is formed so that strength of the bond (joint strength) between the solder and the article decreases.

Addition of not less than 0.1% by weight aluminium was found to overcome the above disadvantage. However, addition of more than 2% by weight aluminium lowers the melting temperature of the alloy below 400° C. The aluminium content of the alloy should be no more than 2% by weight, and the preferred aluminium content ranges from 0.3 to 1% by weight.

MAGNESIUM

Magnesium is remarkably effective in inhibition of intergranular corrosion in a zinc-based alloy. The conventional zinc-based diecasting alloy contains 0.03–0.06% by weight magnesium for the purpose of inhibition of intergranular corrosion. A solder alloy containing magnesium, therefore, is useful for soldering articles of zinc-based alloy or an article of the zinc-base alloy and that of aluminium. But when articles of other metals are soldered therewith, intergranular corrosion easily occurs.

It was found by us that addition of magnesium in combination with chromium and/or nickel to the solder alloy greatly improves resistance to intergranular corrosion, but that more than 0.3% by weight magnesium makes the soldering operation difficult. The present solder should contain 0.01–0.3% by weight magnesium, and the preferred magnesium content ranges from 0.03 to 0.2% by weight.

OTHER ELEMENTS

Incidental impurities, such as tin, lead and cadmium, may be allowed in the present alloy. However, it is desirable to exclude such impurities from the present alloy, since a small amount of any one of them causes intergranular corrosion.

There is no particular problem in preparation of the solder of this invention. Usually mother alloys which have been prepared in advance are used.

An exemplary procedure for the preparation of the present alloy will be described, the alloy of Example 1 being taken as an example. Thus, a graphite crucible is charged with a predetermined amount of zinc, followed by heating to a melt. Then, a predetermined amount of a zinc-silver mother alloy (suitable silver content approx. 10%) and then, a zinc-copper chromium mother alloy (suitable copper content approx. 5%, chromium approx. 2%) and a zinc-copper mother alloy (copper approx. 5%) are added. The melt is stirred well at 500° C. and poured into a casting mould. When wire is the desired product, the melt is cast into a billet and extruded at 200°–300° C. into a rod about 10 mm. in diameter. Finally, the rod is drawn to the predetermined size to obtain the desired type of solder.

Tensile strength, corrosion resistance and impact values of the solders of this invention were determined.

The compositions of the solders are listed in Table 1, which contain the compositions of prior art solders (asterisked) for the purpose of comparison.

TABLE 1

| Example No.: | Ag | Cu | Al | Mg | Cd | Ni | Cr | Zn |
|---|---|---|---|---|---|---|---|---|
| 1 | 3 | 1 | | | | | 0.1 | Rest. |
| 2 | 1 | 0.5 | | | | | 0.05 | Do. |
| 3 | 5 | 2 | | | | | 0.75 | Do. |
| 4* | 1 | 1 | | | | | | Do. |
| 5* | 3 | 1.5 | | | | | | Do. |
| 6 | 1 | 0.5 | 0.3 | 0.03 | | | 0.08 | Do. |
| 7 | 3 | 1 | 0.5 | 0.1 | | | 0.15 | Do. |
| 8 | 5 | 2 | 1 | 0.2 | | | 0.75 | Do. |
| 9* | 2 | 0.5 | 1 | | | | | Do. |
| 10* | 4 | 1 | 2 | 0.04 | | | | Do. |
| 11 | 1 | 0.5 | 0.3 | 0.03 | | 0.08 | | Do. |
| 12 | 3 | 1 | 0.5 | 0.1 | | 0.15 | | Do. |
| 13 | 5 | 2 | 1 | 0.2 | | 0.75 | | Do. |
| 14* | 2 | 0.5 | 1 | | | | | Do. |
| 15* | 1.8 | 0.15 | | | Rest. | | | 10. |
| 16* | 2.0 | 3.2 | 4.3 | | | | | Rest. |

Tensile test

Tensile testing was carried out according to JIS (Japanese Industrial Standard) Z2201–4. The test pieces were 50 mm. in gauge length and 14 mm. in diameter. The stretching rate was 10 mm./min. The results are shown in Table 2.

Corrosion test

Test pieces were suspended in a stainless steel vessel over boiling water and exposed to the steam generated therein for a given period of time.

Test pieces were copper strips 0.5 mm. in thickness, 20 mm. in width and 50 mm. in length, which were soldered with various solders and by various soldering modes. The degree of resistance to corrosion was determined by comparing decrease in strength of the soldered part of the test pieces. When the difference between the strengths before and after testing was small, the solder was regarded good. If the fractured surfaces of the soldered part of the test pieces which were subjected to the tensile test were blackish and had no metallic luster, the test pieces which showed such sign of corrosion were extremely inferior in strength to the soldered part. The results are shown in Table 2.

Impact test

The impact test was carried out according to the Charpy method as specified in JIS Z–2202. The results are shown in Table 2.

TABLE 2

| Exp. No. | Tensile strength (kg./mm.²) at— | | | | Corrosion after— | | | | | Impact value (kg.-m./cm.²) | M.P. (°C.) |
|---|---|---|---|---|---|---|---|---|---|---|---|
| | Room temp. | 100° C. | 200° C. | 300° C. | 24 hr. | 48 hr. | 72 hr. | 120 hr. | 240 hr. | | |
| 1 | 14.5 | 16.2 | 13.1 | 9.8 | None | None | None | None | None | 6.6 | 444 |
| 2 | 9.8 | 11.0 | 8.1 | 7.5 | do | do | do | do | do | 5.2 | 430 |
| 3 | 20.1 | 22.5 | 18.6 | 10.3 | do | do | do | do | do | 7.5 | 480 |
| 4* | 10.7 | 9.3 | 8.4 | 7.0 | do | do | do | do | Slight corrosion. | 4.9 | 432 |
| 5* | 15.0 | 13.8 | 10.6 | 8.0 | do | do | do | do | do | 6.1 | 452 |
| 6 | 10.2 | 11.7 | 8.6 | 7.9 | do | do | do | do | None | 5.5 | 420 |
| 7 | 14.9 | 16.5 | 15.1 | 10.3 | do | do | do | do | do | 7.1 | 440 |
| 8 | 21.6 | 24.2 | 19.0 | 11.6 | do | do | do | do | do | 8.0 | 478 |
| 9* | 12.1 | 10.4 | 8.9 | 7.8 | Slight corrosion. | Remarkable corrosion. | Disjoined by corrosion. | | | 5.1 | 418 |
| 10* | 19.3 | 17.1 | 14.0 | 10.9 | None | None | Slight corrosion. | Remarkable corrosion. | Complete corrosion. | 6.5 | 434 |
| 11 | 12.6 | 18.0 | 13.9 | 10.0 | do | do | None | None | None | 11.1 | 417 |
| 12 | 15.2 | 19.8 | 16.0 | 11.2 | do | do | do | do | do | 12.5 | 432 |
| 13 | 22.9 | 27.0 | 22.3 | 14.4 | do | do | do | do | do | 5.8 | 475 |
| 14* | 12.1 | 10.4 | 8.9 | 7.8 | Slight corrosion. | Remarkable corrosion. | Disjoined by | | | 5.1 | 418 |
| 15* | 14.1 | 13.0 | 4.8 | | None | None | None | Slight corrosion. | Remarkable corrosion. | 6.9 | 294 |
| 16* | 24.1 | 18.2 | 12.5 | 6.3 | Slight corrosion. | Remarkable corrosion. | Disjoined by | | | 5.5 | 415 |

From the foregoing it is apparent that the solder of the present invention has excellent tensile strength, particularly at high temperatures, and overcome the disadvantages of brittleness and poor resistance to corrosion, which were incidental to the prior art solders.

The solder of the present invention is very useful for soldering articles of copper, iron, aluminum or alloys thereof.

What we claim are:

1. A solder alloy having improved strength at an elevated temperature, which consists essentially of 0.5–7% by weight silver, 0.5–2.5% by weight copper, at least one of 0.05–2% by weight chromium, 0.05–1% by weight nickel, and the balance of zinc.

2. A solder alloy as defined in claim 1, which comprises 0.1–2% by weight aluminum and 0.01–0.3% by weight magnesium.

3. A solder alloy having improved strength at an elevated temperature, which consists essentially of 1–5% by weight silver, 0.5–2% by weight copper, at least one of 0.05–0.75% by weight chromium, 0.05–0.75% by weight nickel, and the balance of zinc.

4. A solder alloy as defined in claim 3, which comprises 0.3–1% by weight aluminium and 0.03–0.2% by weight magnesium.

References Cited

UNITED STATES PATENTS

| 1,663,215 | 3/1928 | Peirce et al. | 75—178 AM |
| 2,008,529 | 7/1935 | Werley | 75—178 AM |
| 2,279,282 | 4/1942 | Wassermann | 75—178 C |
| 2,279,284 | 4/1942 | Wassermann | 75—178 C |

FOREIGN PATENTS

| 414,211 | 5/1925 | Germany | 75—178 C |
| 39/22,124 | 2/1962 | Japan | 75—178 AM |
| 840,188 | 4/1939 | France | 75—178 AM |
| 1,260,326 | 3/1961 | France | 75—178 AC |
| 359,009 | 1/1962 | Switzerland | 75—178 AC |
| 403,975 | 5/1943 | Italy | 75—178 R |

L. DEWAYNE RUTLEDGE, Primary Examiner

E. L. WEISE, Assistant Examiner